United States Patent [19]

Iyeta

[11] 4,007,939
[45] Feb. 15, 1977

[54] MECHANISM FOR SUPPORTING PICKUP ARM IN DISC RECORD PLAYER OF LINEAR TRACKING ARM TYPE

[75] Inventor: Motoi Iyeta, Hamakita, Japan

[73] Assignee: Nippon Gakki Seizo Kabushiki Kaisha, Hamamatsu, Japan

[22] Filed: July 9, 1975

[21] Appl. No.: 594,557

[30] Foreign Application Priority Data

July 14, 1974 Japan ............... 49-87861
July 25, 1974 Japan ............... 49-85320

[52] U.S. Cl. ............................ 274/23 A
[51] Int. Cl.² ........................... G11B 3/10
[58] Field of Search ....................... 274/23

[56] References Cited
UNITED STATES PATENTS

| 2,413,206 | 12/1946 | Worsham | 274/23 A |
| 2,915,315 | 12/1959 | Rabinow | 274/23 A |
| 3,272,513 | 9/1966 | Jeles | 274/23 A |
| 3,767,848 | 10/1973 | Schuller et al. | 274/23 A |

FOREIGN PATENTS OR APPLICATIONS 444,482   12/1969   Japan ................. 274/23 A Primary Examiner—Richard E. Aegerter
Assistant Examiner—John W. Shepperd
Attorney, Agent, or Firm—Cushman, Darby & Cushman

[57] ABSTRACT

A mechanism for supporting a pickup arm in a linear tracking arm type disc record player comprising an upper guide rail having a groove, a lower guide rail extending parallel to the upper guide rail, and a pickup-arm supporting movable frame having first rollers engaging in the groove of the upper guide rail for suspension of the movable frame therefrom and having second rollers contacting the lower guide rail to allow the movable supporting frame to make smooth linear travel on this lower guide rail without unwanted pivotal movement. This arrangement insures smooth linear tracking of the pickup arm with no rattling-type travel and eliminates the need for highly trained skill in assembling the whole mechanism.

5 Claims, 5 Drawing Figures

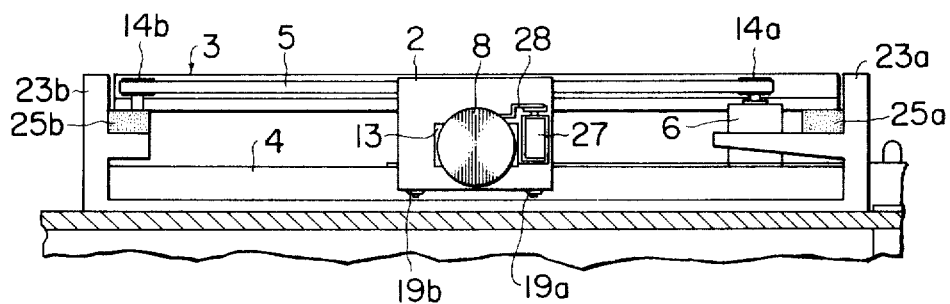
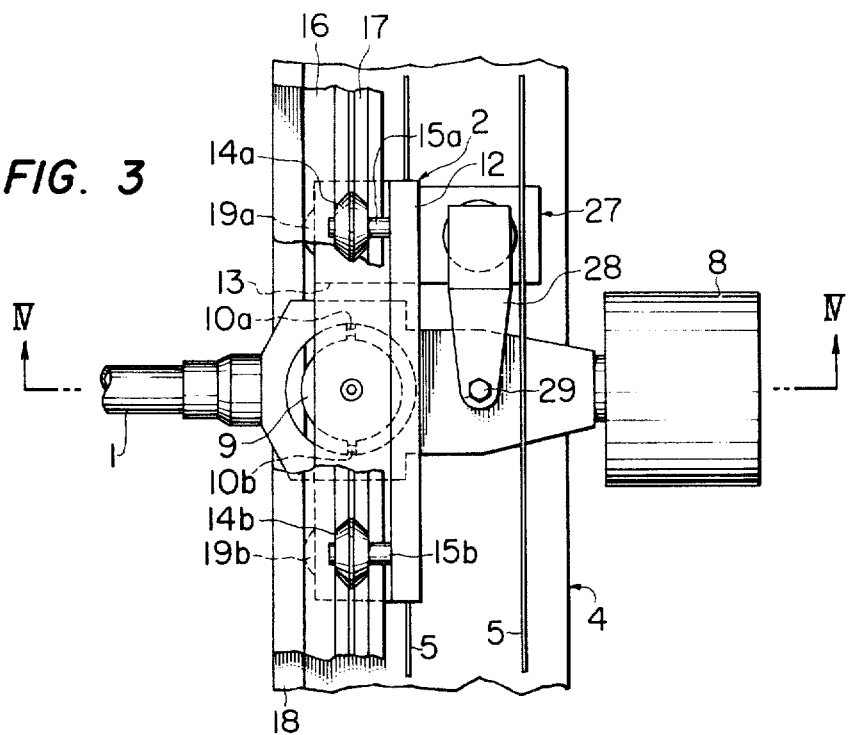
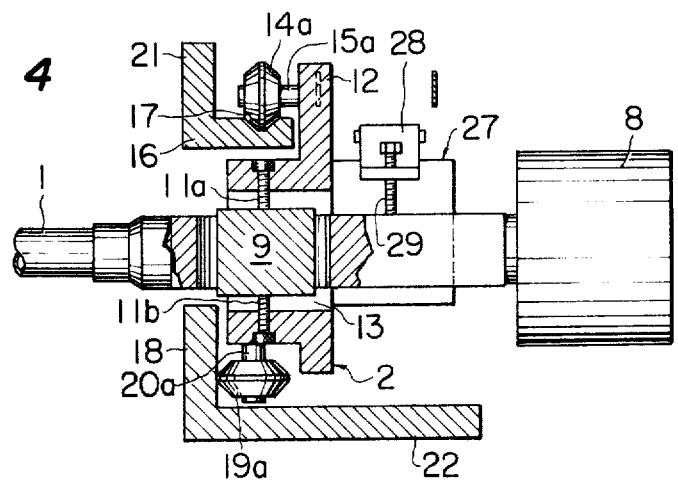

MECHANISM FOR SUPPORTING PICKUP ARM IN DISC RECORD PLAYER OF LINEAR TRACKING ARM TYPE

BACKGROUND OF THE INVENTION

Field of the Invention

The present invention concerns a disc record player, and more particularly it relates to a mechanism for supporting the pickup arm in a linear tracking arm type disc record player designed so that the pickup arm is allowed to make a linear travel along a radial direction of the disc record mounted on the platter of the player.

As an apparatus for reproducing the recorded sounds of a disc record, there is the known device which is called the linear tracking type disc record player designed so that the pickup arm is allowed to make a linear travel radially of the disc record in the same manner as in the case of a cutter head for obtaining the sound groove. In such a record player, in general, a pickup arm is constructed so that its supporting movable frame is supported on a guide rail so as to be able to travel on this guide rail. The pickup arm supporting frame is adapted to be moved on the guide rail from a separate driving mechanism so as to cause a straight-line travel of the pickup arm radially of the disc record. The driving mechanism employs an endless belt or a feed screw.

Japanese Patent Publication Specification Sho 40-2610 discloses an arrangement wherein a pickup arm is supported on a slidable frame which, in turn, is arranged so as to travel on a guide rail which is fixed to brackets. A feed screw which is supported on the brackets is rotated in synchronism with the rotation of the platter to thereby accomplish a straight-line tracking movement of the pickup arm. The above-mentioned Patent Publication also discloses that the driving mechanism uses an endless belt and further shows a synchronising means which is of the type that a motor switch is adapted to be rendered "on" and "off" in accordance with the positional displacement of the pickup arm.

Also, Japanese Patent Publication No. Sho 47-45002 which is based on the U.S. application Ser. No. 755,598 filed on Aug. 27, 1968 now U.S. Pat. No. 3,572,724 discloses an arrangement wherein a slidable frame which supports a pickup arm has four wheels which are adapted to travel on substantially U-shaped parallel rails which are united together at one end. The driving mechanism of this arrangement employs an endless belt which is provided between these rails. A motor for driving the belt is adapted to be controlled by a switch which is actuated in association with the positional displacement of the pickup arm.

Furthermore, Japanese Patent Publication No. Sho 42-18028 discloses an arrangement wherein a slidable frame for supporting a pickup arm has guide wheels engaging two guide bars so as to be moved along the guide bars. The driving of the slidable frame is performed by a cylinder which is parallel with the guide bars and by a driving roller provided on the slidable frame. This cylinder rotates in synchronism with the rotation of the platter. The driving roller is adapted to be tilted in accordance with the positional displacement of the pickup arm.

In general, in order to insure that a slidable frame which supports a pickup arm moves smoothly without any play on a guide rail in a linear tracking type disc record player, not only a precision processing technique of a very high degree is needed, but also an assembling technique of a very high degree of precision is required, the pickup arm supporting mechanism as a whole becoming complicated, and thus the manufacture of the device tends to become quite expensive. Moreover, the respective component parts are required to be arranged so as to produce as little vibration and noise as possible. Especially, in case the arrangement includes a plurality of guide rails, vibrational resonance is developed between such guide rails. This is an important thing but heretofore no sufficient consideration has been paid to this point.

SUMMARY OF THE INVENTION

It is, therefore, a primary object of the present invention to provide a mechanism for performing a linear movement of the pickup arm radially of the disc record in a disc record player, which can move the pickup arm smoothly, substantially without play, and which can attain such a straight-line movement without requiring any high degree of assembling techniques.

Another object of the present invention is to provide a mechanism for performing a linear movement of the pickup arm radially of the disc record in a disc record player as described above, which makes an extremely stable and smooth operation.

Still another object of the present invention is to provide a mechanism of the type described above, which can use a plurality of guide rails without causing vibrational resonance therebetween.

These as well as other objects and features of the present invention will become apparent by reading the following detailed description of the present invention when taken in conjunction with the accompanying drawings.

BRIEF DESCRIPTION OF THE DRAWINGS

FIG. 2 is a rear view of the mechanism for supporting the pickup arm shown in FIG. 1, partly in section, taken along the line II—II of FIG. 1.

FIG. 3 is an enlarged plan view, partly broken away, showing the essential parts of the mechanism shown in FIG. 1.

FIG. 4 is a sectional view taken along the line IV—IV in FIG. 3.

DETAILED DESCRIPTION OF THE PREFERRED EMBODIMENTS

Figure 1:
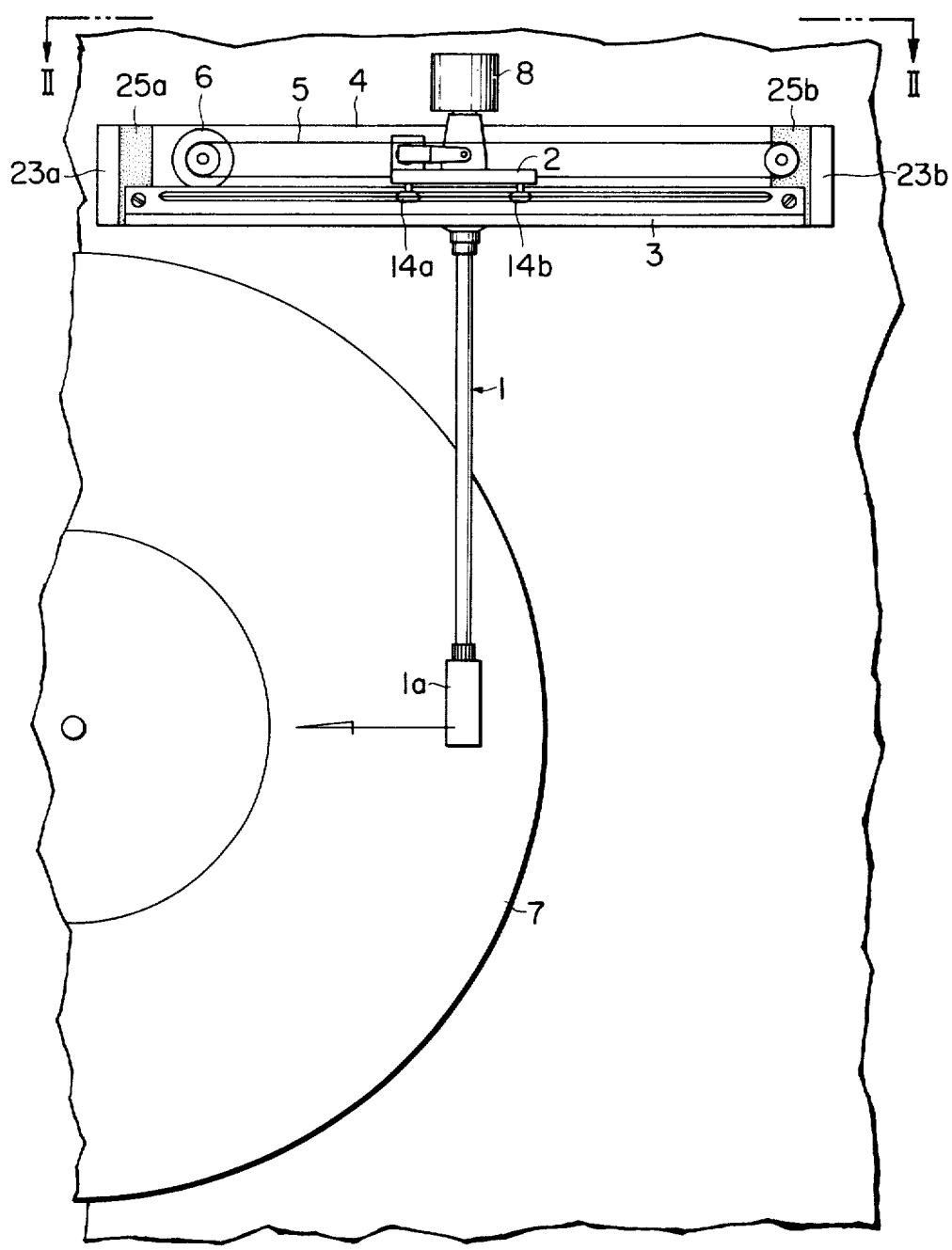
FIG. 1 is a plan view, showing essential parts of a linear tracking type disc record player having a mechanism for supporting a pickup arm for linear movement embodying the present invention.
Figure 5:
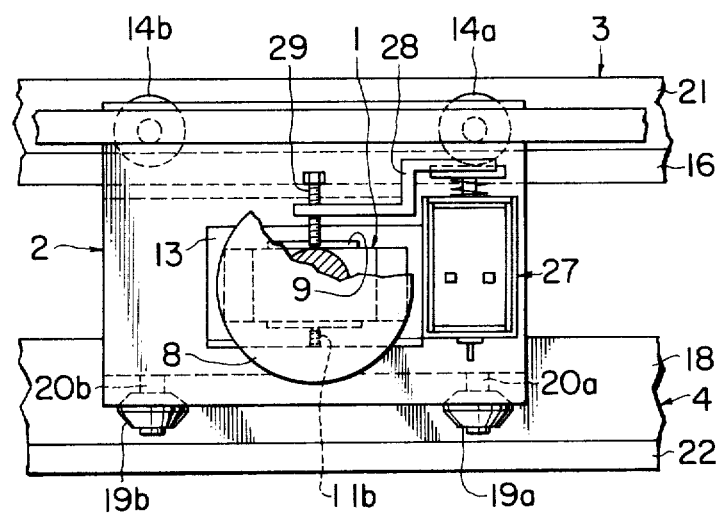
FIG. 5 is a rear view taken from the line V—V of FIG. 3, with the constituting components being partly broken away.

The gist of the present invention will hereunder be described first. The mechanism for supporting a pickup arm in a linear tracking arm type disc record player embodying the present invention comprises, generally, a movable supporting frame 2 for supporting a pickup arm 1 and first and second guide rails 3 and 4 for the movable supporting frame 2. The pickup arm 1 is supported on the movable frame 2 for both horizontal and vertical swinging movments. The movable supporting frame 2 is supported for movements on these two guide rails. An endless belt 5 is driven by a motor 6 so that the pickup arm 1 is caused to travel always keeping its position tangential to the sound groove of the disc record 7, or more precisely speaking, the pickup arm 1 is adapted to travel in such a way that the rectilinear line connecting the center of the swinging movement of the pickup arm and the tip of the stylus is always in agreement with a tangential line of the sound groove of the disc record.

The present invention will hereunder be described in further detail with respect to the essential parts of the arrangement.

The pickup arm 1, like those of this type of the prior art, has a head shell 1a detachably secured to one end thereof and a counter weight 8 secured at the other end. The pickup arm is supported, at an intermediate site of its length, on a movable supporting frame 2 by a bearing. The pickup arm 1 is retained in its horizontal position by the adjustable position of the counter weight. By moving the counter weight closer toward the head shell 1a or by urging the pickup arm by a leaf spring, the vertical tracking force can be obtained as desired. The pickup arm in a linear tracking type record player, of course, does not have an offset angle but it is comprised of a straightly extending arm.

The bearing mechanism for the pickup arm is made with a known gimbal type structure. This structure is arranged so that a block 9 is positioned in an opening provided at the base portion of the pickup arm. The pickup arm is supported on the block 9 so as to be pivotable vertically by a pair of pivots 10a and 10b. Along with this, the block 9 is supported on a movable supporting frame 2 by another pair of pivots 11a and 11b, to thereby render the pickup arm swingable horizontally. These respective pairs of pivots are arranged so that the lines connecting the two pivots in the respective pairs cross each other at right angle. The point of crossing of these two lines constitutes the center of the pivotal movement of the pickup arm. The pickup arm is adapted to be moved in such a way that the rectilinear line connecting the cross point and the tip of the stylus attached to the cartridge provided within the head shell is kept always in agreement with a tangential line, radially of the sound groove of the disc record.

The movable supporting frame 2 has a base portion which is substantially a partially solid box in shape. A wall portion 12 extends vertically on top thereof and formed integrally therewith. An opening 13 is formed through the base portion for the insertion therethrough of the pickup arm 1. The block 9 of the pickup arm 1 is positioned within the opening 13 and the pivots 10a and 10b supporting the block 9 are fixed to the base portion of the supporting frame. A pair of rollers 14a and 14b are rotatably secured at positions close to the opposite ends of the wall portion 12. More precisely, these rollers are rotatably secured to the free ends of shafts 15a and 15b, respectively, which are fixed to the wall portion 12 and are extended at right angles thereto. These rollers are mounted on the guide rail 3 to thereby suspend both the movable supporting frame 2 and the pickup arm 1 from this guide rail 3. Such an arrangement will be understood to present the structure in which the rollers 14a and 14b are spaced, at a distance, from the wall portion 12 of the movable supporting frame 2 by the shafts 15a and 15b so that the weight of the base portion of the movable supporting frame 2 and the weight of the pickup arm 1 are both applied to a position which is lower than the points of contact of the rollers with the guide rail 3. As a result, there will develop a moment of a swinging of both the supporting frame 2 and the pickup arm 1 about such points of contact. The moment of swinging is clockwise, in FIG. 4, about the points of contact of the rollers 14a and 14b with the guide rail 3. That is, the supporting frame 2 makes a biasing movement toward the second guide rail 4.

The guide rail 3 will be described in further detail. It has a horizontally extending wall portion 16. This wall portion 16 has a groove 17 formed so as to cross, at right angle, the aforesaid rectilinear line of the pickup arm 1. The rollers 14a and 14b of the movable supporting frame 2 engage in the groove 17 so that both the supporting frame 2 and the pickup arm 1 are suspended from the guide rail 3. The aforesaid swinging movement resulting from such an arrangement serves to keep the pickup arm 1 parallel with the disc record by the cooperation of another guide rail 4.

This another guide rail 4 has a wall portion 18 which has a wall surface crossing, at right angle, the aforesaid rectilinear line of the pickup arm 1 and extending vertically in cross sectional profile. At a lower portion of the supporting frame 2, on the other hand, a pair of rollers 19a and 19b are rotatably secured to shafts 20a and 20b, respectively, which in turn are fixed to the movable supporting frame 2 in such a way that the axes of rotation of these rollers 19a and 19b extend at right angle to the shafts 15a and 15b of the rollers 14a and 14b. These rollers 19a and 19b are positioned so as to engage the wall surface of the wall portion 18 of the guide rail 4 so that the pickup arm 1, or more precisely the plane containing the aforesaid rectilinear line of the pickup arm, is in parallel with the surface of the disc record 7 mounted on the player.

These guide rails 3 and 4 are formed to have L-shaped cross sections, respectively, with wall portions 21 and 22 extending at right angle to the aforesaid wall portions 16 and 18, respectively, thus providing sufficient rigidity. At the opposite ends of the guide rail 4 are formed columns 23a and 23b integrally therewith. These columns have supporting arms 24a and 24b, respectively, projecting toward each other. These respective supporting arms 24a and 24b have a surface, respectively, which is parallel with a plane including the aforesaid rectilinear line of the pickup arm. The guide rail 3 is provided on these surfaces.

Between the guide rail 3 and the supporting arms 24a and 24b of the guide rail 4 are provided impact-absorbing buffer members 25a and 25b. These buffer members are made of rubber or a shock-absorbing synthetic resin. These buffer members are provided to absorb vibrations developing in either one or both of the guide rails and to thereby prevent such vibrations from giving ill effect to each other. More specifically, the guide rails for use in a disc record player having a linear tracking arm is required to have a length at least corresponding to the length of the radius of a disc record to be mounted on the player. Thus, the pickup arm tends to be of a considerably great length and is easy to vibrate. In case two guide rails are united simply to each other as an integral body, such guide rails will easily develop vibrational resonances causing noises. In spite of the fact that such vibrational resonances give not a small ill effect on the quality of the reproduced sounds, no sufficient consideration has been given to this fact in the past. According to the present invention, it is possible to almost perfectly clear out such undesirable vibrations or noises by the adoption of the above-discussed arrangement.

Furthermore, the above-mentioned arrangement of the guide rails 3 and 4 makes the assemblage of the pickup arm supporting mechanism quite easy to make. In other words, by first setting the movable supporting frame 2 on the guide rail 3, and then by moving the rail 3 relative to the rail 4, it is possible to adjust the movement linearity of the supporting frame 2. And, by preparing such an assembly in advance, it becomes possible to obtain, at the time the assembly is set on a chassis or frame of the record player, a desirable linear movement of the pickup arm without requiring a high degree of technique of adjustment, and thus the whole assembling can be done easily.

The driving mechanism for moving the movable supporting frame 2 on the guide rails 3 and 4 relies on an endless belt 5. This belt 5 is applied between pulleys 26a and 26b which are supported on the supporting arms of the columns of the guide rail 4. The movable supporting frame 2 is coupled to a portion of the belt 5 lying on one of the rectilinearly extending regions of this belt. Thus, the supporting frame 2 is caused to make linear travel in accordance with the rotation of the pulleys. These pulleys are rotated from a motor 6 which is coupled to the pulley 16a. This motor 6 is secured to the supporting arm 24a of the guide rail 4 via a buffer means to prevent the vibrations of this motor from being transmitted to the guide rails. The motor 6 is controlled as to its rotation speed so as to insure that the pickup arm 1 is always placed at a position tangential to the sound groove.

The uplifting and lowering of the pickup arm 1 from and onto the disc record is performed by a lifter 27 of the movable supporting frame 2. This lifter 27 is provided on the supporting frame 2 and the piston rod of this lifter has an arm 28 secured thereto. An adjustment screw 29 which is positioned on the rear end side of the pickup arm is in contact with this pickup arm at a point closer to the counter weight from the supporting fulcrum of the pickup arm, so that the pickup arm is allowed to be lifted along with the lowering movement of the piston rod and to be lowered in accordance with the ascension of the piston rod.

It will be understood by those skilled in the art that the pickup arm supporting mechanism of the present invention can be used not only in an apparatus for the reproduction of tone signal recorded on a phonograph disc, but also in an apparatus for the reproduction of image signal recorded on a video disc. For this reason, the appending claims are not limited to the above-mentioned examples.

I claim:

1. A pickup arm supporting mechanism for a linear tracking arm type disc record player comprising:
a first horizontally disposed guide rail and a second vertically disposed guide rail spaced vertically below said first guide rail with both said guide rails extending parallel to each other,
a pickup arm supporting frame, a pickup arm, means mounting said pickup arm on said supporting frame for vertical as well as horizontal swinging movements,
said pickup arm supporting frame having an upper portion and a lower portion with said means mounting said pickup arm disposed between said upper and lower portions, said upper portion having horizontally extending shaft means and first roller means mounted for free rotation about a horizontal axis on said horizontal shaft means, said first roller means engaging said first guide rail for movement therealong with said supporting frame suspended from said first guide rail on said roller means about a horizontal pivot axis said lower portion having vertically extending shaft means and second roller means mounted for free rotation about a vertical axis on said vertical shaft means, and engaging said second guide rail for movement therealong, the line of engagement of the second guide rail and second roller means being offset from the vertical plane containing the line of engagement of said first roller means with said first guide rail said supporting frame and pickup arm mounted thereon having a weight disposition relative to said first roller means such that a moment is created about the point of engagement of said first roller means with said first guide rail tending to urge said lower portion of said supporting frame toward said second guide rail to maintain contact between said second guide rail and said second roller means, and said second roller means engaging said second guide rail so that a horizontal force applied to said arm in a direction away from said frame urges said second roller means against said second guide rail.

2. A pickup arm supporting mechanism according to claim 1, in which said upper portion of said pickup arm supporting frame includes a wall portion extending on top of said frame, and in which said shaft means for said first roller means is secured extending from said wall portion so that said first roller means is positioned at a distance from said wall portion.

3. A pickup arm supporting mechanism according to claim 1, in which each of said first and second roller means is comprised of a pair of rollers spaced apart from each other.

4. A pickup arm supporting mechanism according to claim 1, in which said first guide rail has a horizontally extending wall portion and said horizontally extending wall portion has a groove formed on one surface thereof, and said first roller means is rotatably engaged in said groove of said wall portion.

5. A pickup arm supporting mechanism according to claim 1, for which said first guide rail is coupled, via buffer means, to said second guide rail.

* * * * *